US009429046B2

(12) United States Patent
Öström et al.

(10) Patent No.: US 9,429,046 B2
(45) Date of Patent: Aug. 30, 2016

(54) METHOD FOR CONVERSION OF LOW TEMPERATURE HEAT TO ELECTRICITY AND COOLING, AND SYSTEM THEREFORE

(75) Inventors: Thomas Öström, Sollentuna (SE); Joachim Karthäuser, Sollentuna (SE)

(73) Assignee: Climeon AB, Taby (SE)

( * ) Notice: Subject to any disclaimer, the term of this patent is extended or adjusted under 35 U.S.C. 154(b) by 240 days.

(21) Appl. No.: 13/582,369

(22) PCT Filed: Mar. 22, 2012

(86) PCT No.: PCT/SE2012/050319
§ 371 (c)(1),
(2), (4) Date: Aug. 31, 2012

(87) PCT Pub. No.: WO2012/128715
PCT Pub. Date: Sep. 27, 2012

(65) Prior Publication Data
US 2013/0038055 A1    Feb. 14, 2013

Related U.S. Application Data

(60) Provisional application No. 61/468,474, filed on Mar. 28, 2011.

(30) Foreign Application Priority Data

Mar. 22, 2011   (SE) .................................... 1100208
Aug. 18, 2011   (SE) .................................... 1100596

(51) Int. Cl.
F01K 25/06    (2006.01)
F01K 25/10    (2006.01)
(Continued)

(52) U.S. Cl.
CPC ............... F01K 25/065 (2013.01); F01K 3/00 (2013.01); F01K 25/103 (2013.01)

(58) Field of Classification Search
CPC ........ F01K 25/00; F01K 25/06; F01K 25/065
USPC .......................... 60/649, 39, 181, 39.52, 673
See application file for complete search history.

(56) References Cited

U.S. PATENT DOCUMENTS 4,009,575 A    3/1977  Hartman, Jr. et al.
4,512,394 A    4/1985  Kauffman
(Continued)

FOREIGN PATENT DOCUMENTS

CN    101101158 A    1/2008
WO    0066887 A1    11/2000

OTHER PUBLICATIONS

PCT/SE2012/050319—European Search Report dated Oct. 13, 2015, 9 pages.

*Primary Examiner* — Jesse Bogue
*Assistant Examiner* — Deming Wan
(74) *Attorney, Agent, or Firm* — Haynes Beffel & Wolfeld LLP

(57) ABSTRACT

A method for producing electrical energy is disclosed which uses a heat source, such as solar heat, geothermal heat, industrial waste heat or heat from power production processes, providing heat of 150° C. or below, further comprising an absorber system in which a working gas, primarily carbon dioxide $CO_2$, is absorbed into an absorbent, typically an amine, further comprising a reactor which receives heat from said heat source and in which the absorbent-$CO_2$ mixture is split into $CO_2$ and absorbent, further comprising an expansion machine, an electricity generator and auxiliary equipment such as pumps, pipes and heat exchangers. The system according to the method allows the cost-efficient production of electrical energy and cooling using low value heat source.

32 Claims, 6 Drawing Sheets

(51) Int. Cl.
*F01K 25/14* (2006.01)
*F01K 3/00* (2006.01)

(56) References Cited

U.S. PATENT DOCUMENTS

| | | | |
|---|---|---|---|
| 5,398,497 A | 3/1995 | Suppes | |
| 5,557,936 A * | 9/1996 | Drnevich | 60/649 |
| 6,209,307 B1 * | 4/2001 | Hartman | 60/780 |
| 6,269,644 B1 * | 8/2001 | Erickson et al. | 60/649 |
| 6,668,554 B1 | 12/2003 | Brown | |
| 7,019,412 B2 | 3/2006 | Ruggieri et al. | |
| 7,685,820 B2 * | 3/2010 | Litwin et al. | 60/641.11 |
| 2008/0047502 A1 | 2/2008 | Morse | |
| 2009/0071153 A1 * | 3/2009 | Boyapati et al. | 60/641.2 |
| 2009/0158739 A1 | 6/2009 | Messmer | |
| 2010/0077752 A1 | 4/2010 | Papile | |
| 2010/0154419 A1 | 6/2010 | Kontomaris | |
| 2010/0212318 A1 | 8/2010 | Schaal | |
| 2010/0236242 A1 * | 9/2010 | Farsad et al. | 60/685 |
| 2010/0251711 A1 | 10/2010 | Howes et al. | |

\* cited by examiner

METHOD FOR CONVERSION OF LOW TEMPERATURE HEAT TO ELECTRICITY AND COOLING, AND SYSTEM THEREFORE

FIELD OF THE INVENTION

The present invention relates to a method, below named Carbon Carrier Cycle, C3, for highly efficient conversion of low temperature heat to electricity and cooling. The invention combines the fields of thermodynamics, chemistry and power generation.

BACKGROUND OF THE INVENTION

Current methods of converting low temperature heat below 150° C. to electricity include derivatives of the Rankine cycle such as the Organic Rankine cycle, the Kalina cycle and the Trilateral flash cycle.

Even though the current methods can produce electricity even down to temperatures as low as 60° C., the conversion efficiency is very low and therefore economically unattractive even in applications where the generated heat is available at very low cost.

The main reasons for the low conversion efficiency compared to the ideal Carnot cycle are large energy losses on the entropy reducing cold side of the system and the very small delta T in the gas expansion. This means that overhead losses largely reduce the practical conversion efficiency.

With a more efficient entropy reduction and a larger delta temperature in the expansion machine, still using the ambient temperature as cold source, largely increased practical conversion efficiency could be achieved.

This is what this invention has solved and the Carbon Carrier Cycle system is built upon.

DESCRIPTION OF THE PRIOR ART

Nuclear fuel and fossil fuel and possibly CSP (concentrated solar power) etc are useful for high temperature generation, subsequent water evaporation and operation of a turbine for electricity generation. In according thermodynamic cycles, initial temperatures of far above 200° C. are used.

A variation of such a thermodynamic cycle is U.S. Pat. No. 4,009,575, where a high pressure (up to 100 bar) $CO_2$ cycle is connected with a medium pressure (1-8 bar) and medium temperature (50-80° C.) $CO_2$ absorption into aqueous $K_2CO_3$ for energy generation.

Similarly, WO 2011/130981 describes thermodynamic cycles in which a gaseous working medium such as methane (or other gases including $CO_2$) can be absorbed by solvents. Typical pressures and temperatures are above 40 bar and above 177° C. in the high pressure section, and 1.6 to 5 bar at very low temperature, e.g. minus 96° C., in the low pressure absorption section.

CZ 302 037 suggests to use a $CO_2$ evaporation/condensation cycle for electricity production, using the evaporation of $CO_2$ with a heat source of max.+25° C. The document does not disclose useful absorbents or chemicals.

SE 9504683 suggests to absorb $CO_2$ in monoethanolamine (MEA) in a modified Carnot process, and to release $CO_2$ from the MEA-$CO_2$ complex by heat from 20 to max 100° C. No details or results are disclosed.

In general terms, it has thus been demonstrated that a high temperature thermodynamic cycle can be operated more efficiently if the condensation or pressure reduction of the working fluid medium (water, $CO_2$, other) downstream of the turbine is enhanced by various means, such as adding chemicals ($NH_3$, Kalina, Goswami) or absorption. Even if the improvements obtained may appear marginal, they may economically be very worthwhile to exploit.

However, no method is known how to operate such a process using heat sources which are considered of low value, i.e. in the range of 60-150° C., or 70-140° C., or 80-130° C. Further, no thermodynamic cycle has been disclosed which can directly generate electricity, heat and cold. In particular, energy in the form of a cold stream, e.g. a fluid having a temperature of minus 25° C. or colder, is very desirable for air-conditioning purposes or for cooling of food. U.S. Pat. No. 4,009,575 describes cooling, but through an indirect process requiring additional equipment.

Further, if chemicals are used to enhance the liquefaction of gases downstream of the turbine for pressure reduction, an amount of energy is released which roughly corresponds to the formation enthalpy of the chemical complex between gas (e.g. $CO_2$) and the chemical (e.g. MEA, see SE 9504683). This energy has to be removed, and has to be provided again in the high temperature side of the thermodynamic cycle, i.e. upstream of the turbine, in order to split the chemical complex. It is obvious that the cycle is more efficient, if this energy is low. On the other hand, low formation enthalpies often entail a slow reaction. Thus, a balance needs to be found between reaction speed and formation enthalpies. For a detailed discussion also of related aspects such as recovery of heat in the process, see the text and literature mentioned below.

Given the risks associated with extensive emissions of greenhouse gases and climate change, there is clearly a need to employ renewable energy sources to a greater extent. The renewable energy which may be used in the invention disclosed below, is constituted by heat sources generally considered as low value heat. Those include solar heat (water, oil etc heated up to below 150° C.), geothermal (also up to 150° C.), industrial waste heat (typically up to 120° C.), heat from combustion processes (also up to 150° C.). Generally, above these temperatures, it is most useful to employ conventional thermodynamic cycles including the ORC (Organic Rankine Cycle) which uses volatile organic liquids instead of water as working medium.

The main disadvantage of the known technology is thus that there is no efficient, convenient method available today which can produce energy in the form of electricity, heat and cold using heat sources today considered being of low value. The methods known under the term ORC cycle are, despite a low thermal-to-electricity conversion efficiency, possibly useful in the temperature range starting from 130° C., but they cannot concurrently and directly provide energy in the form of cold.

It is the objective of the invention to provide such a thermodynamic cycle which can accomplish the direct production of energy in the form of electricity, heat and cold using heat sources today considered being of low value, in particular solar and geothermal heat, as well as industrial waste heat (typically up to 150° C.) and heat from combustion processes, e.g. from conventional power plants or waste heat from engines and the like (also up to 150° C.). In particular, through an optimized process, it is an objective of the invention to be able to produce energy at very low cost. The latter aspect is very important. As shown in FIG. 1a, all thermodynamic cycles operate in a certain pressure-temperature range. In general, equipment and operational costs increase with pressure and temperature. Also, the costs of providing hot media which can drive a thermodynamic cycle, increase with pressure and temperature. Therefore, it is desirable to provide a thermodynamic cycle which operates at relatively low temperatures, e.g. between minus 78° C. and +150° C., and relatively low pressures, e.g. below 10 bar.

SUMMARY OF THE INVENTION

In order to provide the most efficient energy conversion system, one would desire to minimize energy losses at all places in the energy cycle. In order to maximize the competitiveness, the system also needs to be kept simple, robust and avoiding cost driving conditions.

For low temperature conversion specifically, an effective way of minimizing energy losses and reducing material cost would be to cycle around the ambient ground level temperature and around atmospheric pressure. Also maximizing the delta temperature over the expansion machine and minimizing the energy losses during entropy reduction during the cooling part of the cycle is crucial for efficient conversion.

The solution disclosed by this invention optimizes all of the above by dividing the Rankine cycle into a Carbon Carrier Cycle, C3. Instead of a condenser, a carbon dioxide chemical absorption process is used to create a very efficient pressure reduction downstream of the turbine/expansion machine. The working gas for the turbine/expansion machine is thus stored temporarily in liquid state with associated advantages, such as pumpability.

Since the absorption is a spontaneous chemical reaction, the temperature of the gas exiting the turbine/expansion machine may be as low as −70° C. and the efficiency in the cycle can get very close to an ideal Carnot cycle. With a hot source of 90° C. and ambient temperature of 25° C., the C3 will, due to low energy losses and large delta T, be able to reach 15% corresponding to 300% more electricity compared to current low temperature conversion technologies.

The system works at slightly above atmospheric pressure on the high pressure side and close to vacuum on the low pressure side of the turbine/expansion machine, enabling a very cost effective mechanical architecture. The absorber system preferably splits the chemical solvent into small droplets enabling fast absorption, a compact low cost absorber and a compact low cost turbine since the incoming gas is preferred to enter the absorption stage at high velocity.

In an embodiment of this invention an extra reactor booster step is added after the main reactor with the purpose to heat the carbon dioxide gas to even higher temperatures, if a supplementary heat source is available. In some embodiments, the booster is a conventional re-boiler or super-heater, using the same main heat source.

In another embodiment of this invention a concentrator module is added that separates the loaded solvent and the unloaded solvent after the chemical absorption in order to increase the equilibrium gas pressure in the reactor whilst at the same time the absorber pressure is decreased. This step further increases the efficiency and can enable efficient conversion down to temperatures as low as 60° C. in the heat source.

Also the possibility to extract very low temperatures from the expanded gas to provide cooling is an attractive option for some applications.

Typical areas of use for the invention are converting industrial waste heat, geothermal heat, district heat, solar generated heat, bottoming cycle in co-generation power plants, heat from power plants in general, excess heat from combustion based engines, and other combustion generated heat sources to electricity and optionally also external cooling to temperatures between below ambient and −70° C.

DETAILED DESCRIPTION OF THE INVENTION

Figure 1A:
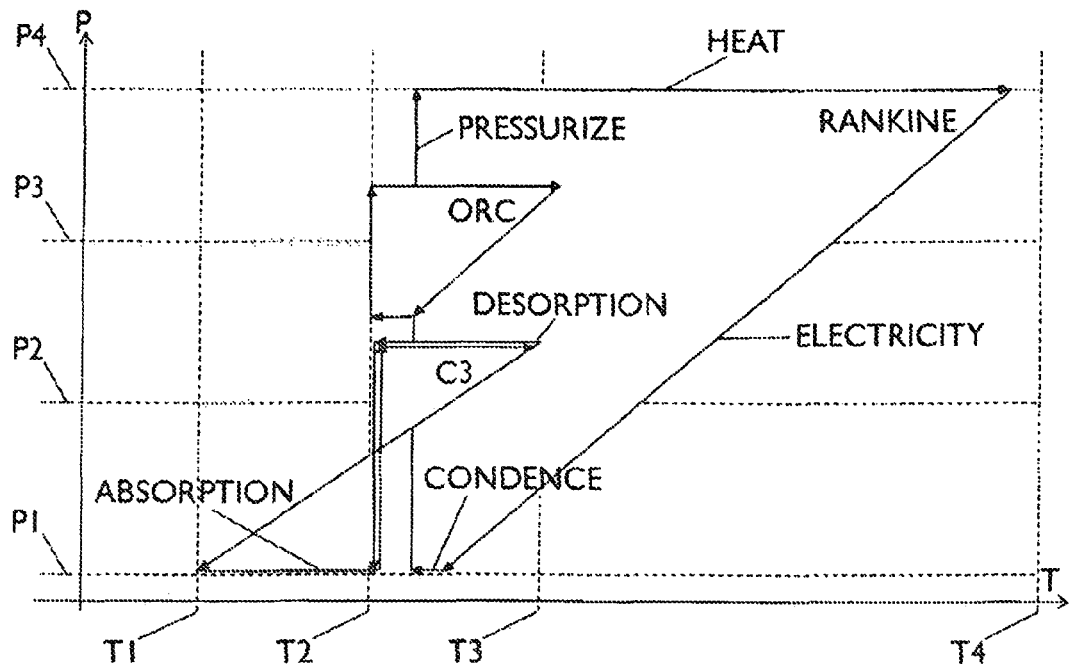
FIG. 1a represents a generalized view of the Carbon carrier cycle with respect to other known power cycles from a pressure versus temperature perspective.

Referring now to the embodiment described in FIG. 1a, representing a generalized view of the Carbon carrier cycle with respect to other known power cycles from a pressure versus temperature perspective.

The Rankine cycle or steam cycle as described works by pressurizing and heat water to produce steam. Electricity is produced by expanding the steam from this point with P4 at typically 100 Bar and T4 at 500° C. down to below 100° C. where it is condensed back to water during cooling creating a low pressure close to vacuum.

The low temperature cycle named Organic Rankine Cycle, ORC, uses the same principle but, instead of water, employs a different working medium with a lower boiling point than water. Typically, this cycle uses a pressure range between 28 Bar to 7 Bar between 90° C. heat source and 25° C. cold source.

The Carbon carrier cycle, C3, works in a different way. Heat is used to chemically desorb $CO_2$ from a carrier medium or working fluid. After the $CO_2$ has created electricity through expansion it is chemically absorbed into the carrier medium during cooling. The chemical absorption is very efficient at creating low pressure, and the $CO_2$ can be expanded to temperatures as low as −78° C. resulting in high power output, despite of low heat source temperatures.

Figure 1B:
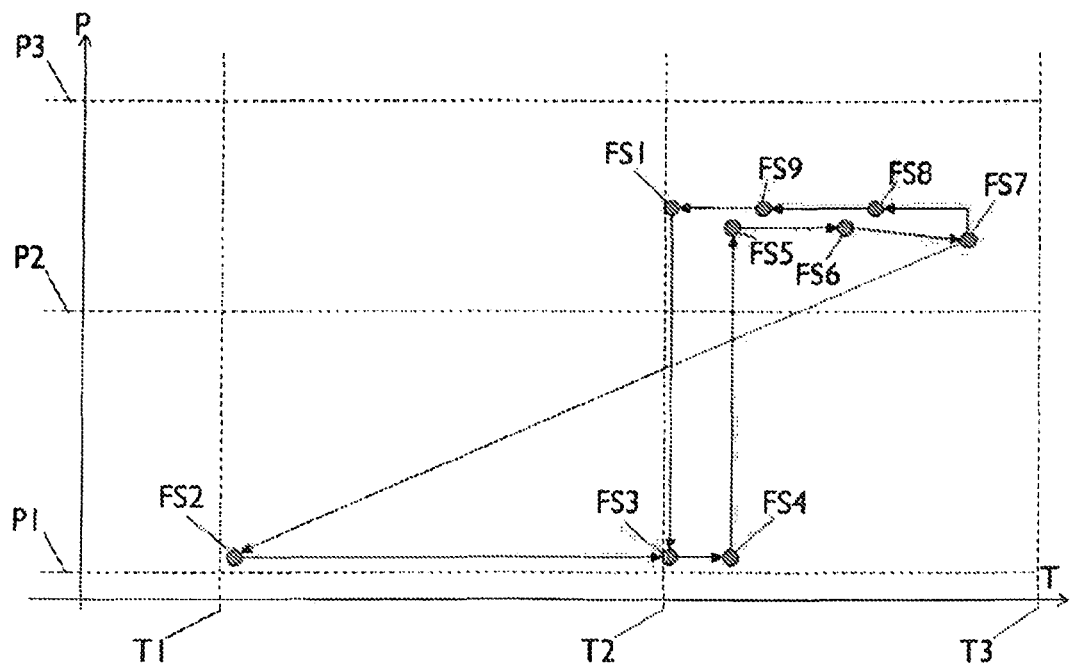
FIG. 1b represents a generalized view of the invented method from a pressure versus temperature perspective of the fluid states involved.

Referring now to the embodiment described in FIG. 1b, representing a generalized view of the invented method from a pressure versus temperature perspective of the fluid states involved.

The essentially closed loop comprises a chemical solvent cooled to ambient temperature T2 at fluid state 1 [FS1]. The solvent is atomized to small droplets FS3 and mixed with $CO_2$ FS2, undergoing a spontaneous chemical reaction to form a $CO_2$ rich liquid solvent FS4 creating a pressure as low as 0.05 Bar P1.

The $CO_2$ rich solvent is pressurized to FS5, heated by re-used heat in the cycle to FS6 and further heated by an external heat source to FS7 at a temperature below 150° C. T3.

During the heating and at a pressure between P2 (typically 1 bar) and P3 (below 20 bar) the $CO_2$ is desorbed from the chemical solvent leaving lean solvent that has, if necessary, been further pressurized in FS8. (The pressure increase between FS4 and FS5 can also be designed to be higher than the pressure delta between FS4 and FS1, obviating the need for an extra pump.) The thermal energy of hot lean solvent is returned to the rich solvent between FS5 and FS6 resulting in a cold lean solvent in FS9.

The carrier medium cycle is closed by further cooling the lean solvent in FS9 back to FS1.

The desorbed $CO_2$ in FS7 is expanded down to FS2 resulting in a temperature as low as minus 78° C.

Between the exit point of the expansion machine FS2 and the chemical absorption FS3, FS4, a heat exchange can be applied as an option to produce cooling for external usage at a temperature between ambient and gas temperature at FS2.

Figure 2A:
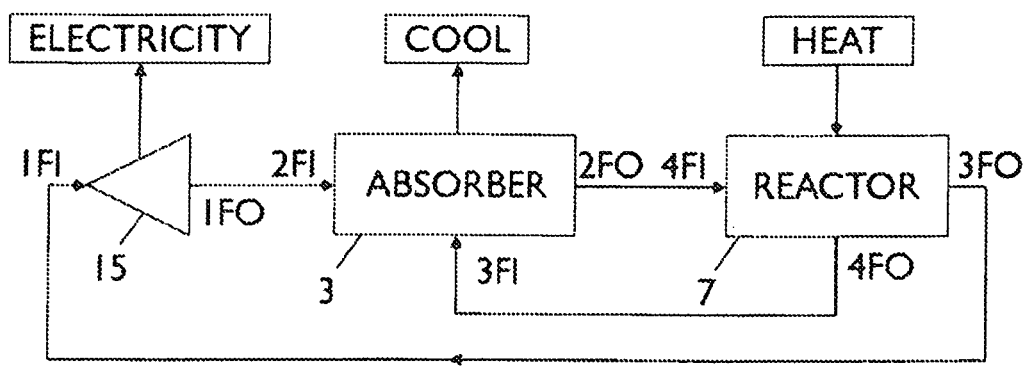
FIG. 2a represents a generalized view of the invented method from a system perspective with respect to fluid inlet and outlets.

Referring now to the embodiment described in FIG. 2a, representing a generalized view of the invented method from a system perspective with respect to fluid inlets and outlets.

A thermal power electricity generating system comprising: an electricity-producing expansion system 15, usable with a working gas, comprising a first fluid inlet I FI and a first fluid outlet I FO;

a thermal cooling source; a chemical absorption system 3 having a second fluid outlet 2 FO and second 2 FI and third fluid inlets 3 FI, the second fluid inlet 2 FI fluidly coupled to the first fluid outlet I FO, the chemical absorption system comprising a liquid chemical absorbent which chemically absorbs the working gas entering the second fluid inlet 2 FI to create a mixture comprising the liquid absorbent and the working gas absorbed into said liquid absorbent; the chemical absorption system energetically coupled to the cold source 4 for delivery of energy for cooling the mixture;

a thermal energy source; a reactor system 7 having a fourth fluid inlet 4 FI and a third 3 FO and fourth fluid outlets 4 FO, the fourth fluid inlet fluidly coupled to the second fluid outlet for receiving the mixture; the reactor system energetically coupled to the thermal energy source for receipt of energy for heating the mixture;

the reactor system 7 operable to separate the mixture into an elevated temperature, elevated pressure working gas and the liquid absorbent; the third fluid outlet 3 FO fluidly coupled to the first fluid inlet to supply the first fluid inlet with the elevated temperature, elevated pressure working gas, the elevated temperature, elevated pressure working gas passing through the electricity-producing expansion system 15 and exiting the first fluid outlet I FO as a lower pressure, lower temperature working gas with the electricity-producing expansion system generating electricity; and the fourth fluid outlet 4 FO fluidly coupled to the third fluid inlet 3 FI to supply the third fluid inlet with the liquid absorbent.

Figure 2B:
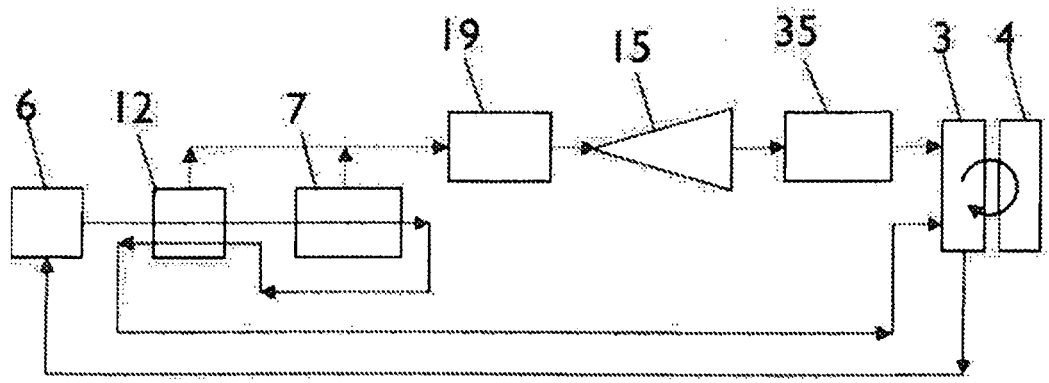
FIG. 2b represents a generalized view of the invented method from a system perspective.

Referring now to the embodiment described in FIG. 2b, representing a generalized view of the invented method from a system perspective, an essentially closed loop comprises a liquid pump 6, a pre-reactor (which can for most practical purposes be considered as heat exchanger and preferably forms a part of a heat exchanger 12), a reactor 7, a booster 19, an expansion system 15, an absorber system 3 and a cooling system 4.

The pump 6 increases pressure of a liquid $CO_2$-absorbent mix, where the pre-reactor and the reactor 7 release the $CO_2$ by thermal heat. The booster 19 further heats the high pressure $CO_2$ before it enters the expansion system 15 to produce electricity. The expanded gas optionally enters a heat exchanger 35 for extracting low temperature either for external cooling applications or cooling the absorbent before absorption. The expanded $CO_2$ and the $CO_2$ free absorbent is chemically absorbed or converted to liquid $CO_2$-absorbent mix in the absorption system 3 during cooling by the cooling system 4 for the process to repeat.

Figure 2C:
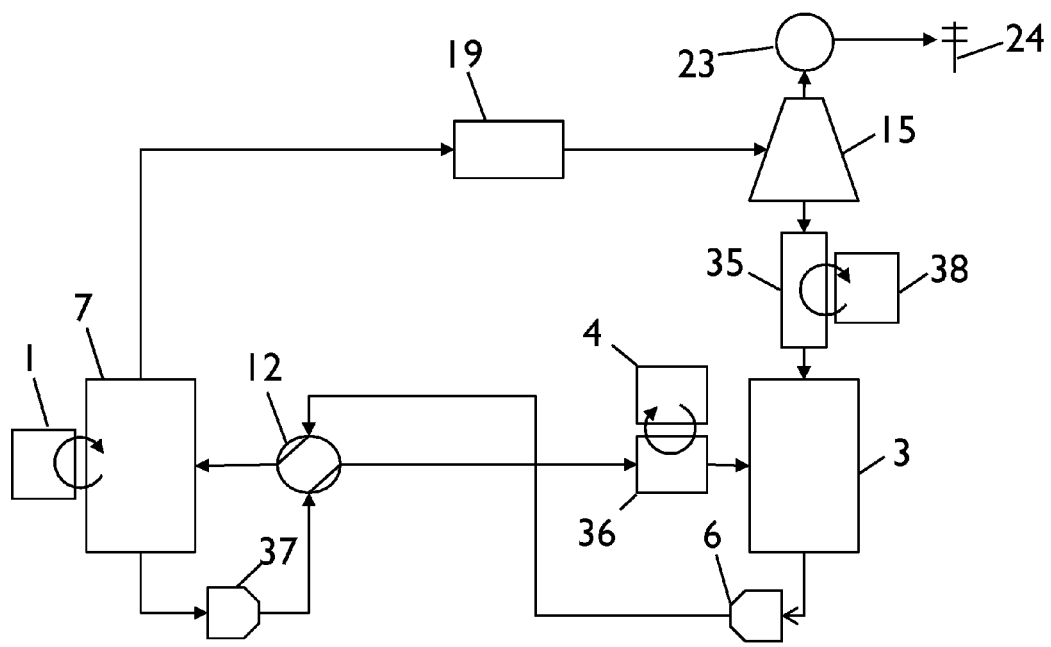
FIG. 2c represents a generalized view of the invented method from a system perspective.

Referring now to the embodiment described in FIG. 2c, representing a generalized view of the invented method from a system perspective.

A reactor 7 receives semi heated gas rich solvent from a heat exchanger 12. By using the thermal energy of the heat medium produced by at least one heat source 1, the rich solvent is further heated and gas is chemically desorbed. The desorbed gas exits the reactor to an optional gas heating booster 19 that further heats the gas before entering the expansion machine 15 to produce electricity 24 via a generator 23. The lean solvent leaves the reactor to transfer its thermal energy to the incoming rich solvent in heat exchanger 12.

The expansion machine 15 expands the heated and pressurized gas to low pressure and low temperature entering an optional heat exchanger 35 to provide external cooling 38 where after the gas enters an absorber 3.

The cold gas that has entered the absorber 3 and the lean solvent that has been pressurized by a liquid pump 37, cooled by heat exchange 36 by a cold source 4 and atomized into small droplets now undergoes a spontaneous exothermal chemical reaction where the gas is absorbed into the lean solvent and exits the absorber to a pump 6.

The rich solvent is sent via the previously described heat exchanger 12 to the reactor 7.

Figure 2D:
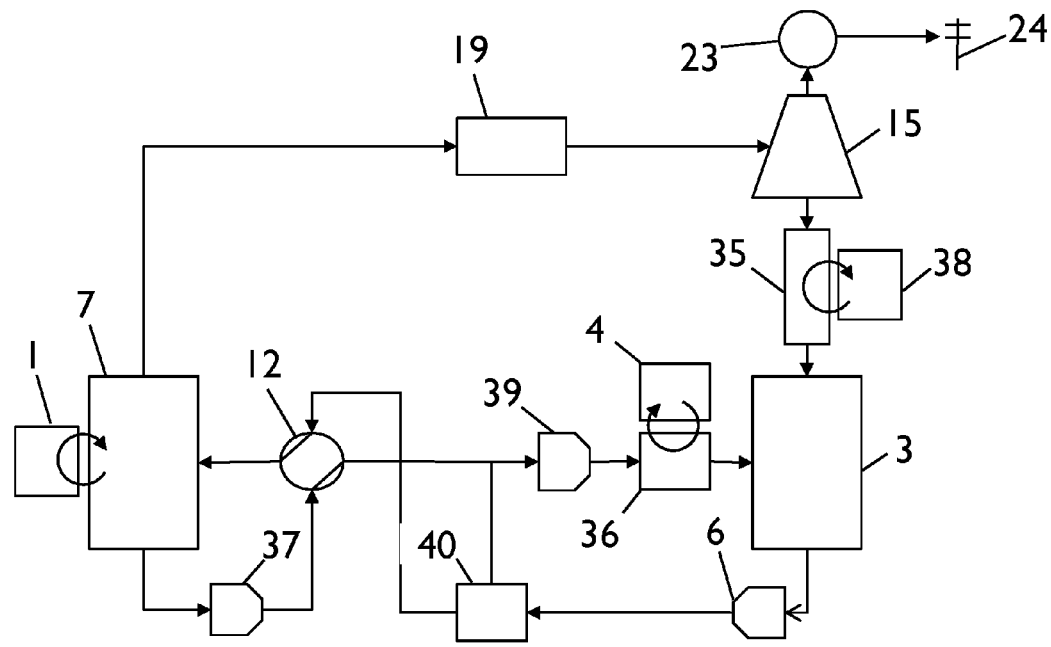
FIG. 2d represents an alternative embodiment compared to 2c.

Referring now to the embodiment described in FIG. 2d, representing an alternative embodiment compared to FIG. 2c.

The rich solvent that exits the absorber contains both loaded solvent and unloaded solvent. For certain chemical systems, it is possible and beneficial to separate these in order to minimize fluid transfer to the reactor and increase the pressure ratio in the expansion machine.

To achieve this, the rich solvent exiting the absorber is pumped by pump 6 to a separator 40.

The separator separates partly the loaded solvent from the unloaded solvent. The unloaded solvent is recycled to the absorber, and the highly rich solvent is sent to the reactor 7 via the heat exchanger 12. For this to work, an additional pump 39 may be required to transfer the lean solvent from the reactor.

Figure 2E:
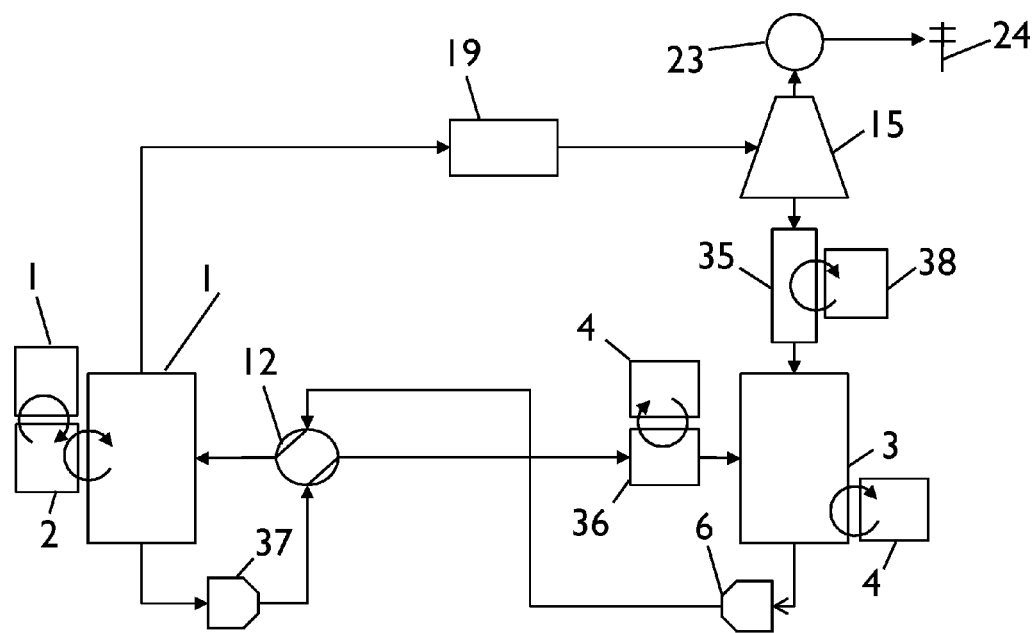
FIG. 2e represents an alternative embodiment compared to 2c and 2d.

Referring now to the embodiment described in FIG. 2e, representing an alternative embodiment compared to the embodiments described in FIGS. 2c and 2d.

The $CO_2$ desorption pressure in the reactor is increased with the loading concentration of $CO_2$ in the chemical solvent achieved in the absorber. Since the absorption is an exothermal reaction it may then be beneficial to provide additional cooling to the absorber in order to further concentrate the solvent.

The difference between this embodiment and the embodiment in FIG. 2c is that additional cooling has been added to the absorber.

FIG. 2e shows a thermal storage unit 2 for storing the thermal working fluid. This enables continued electricity production in periods when the heat source is not active. It is particularly useful in a solar-driven power plant for night operation, but also useful for geothermal, waste heat and similar applications as the heat source may not be available at all times, or may vary regarding temperature and quantity.

Figure 3A:
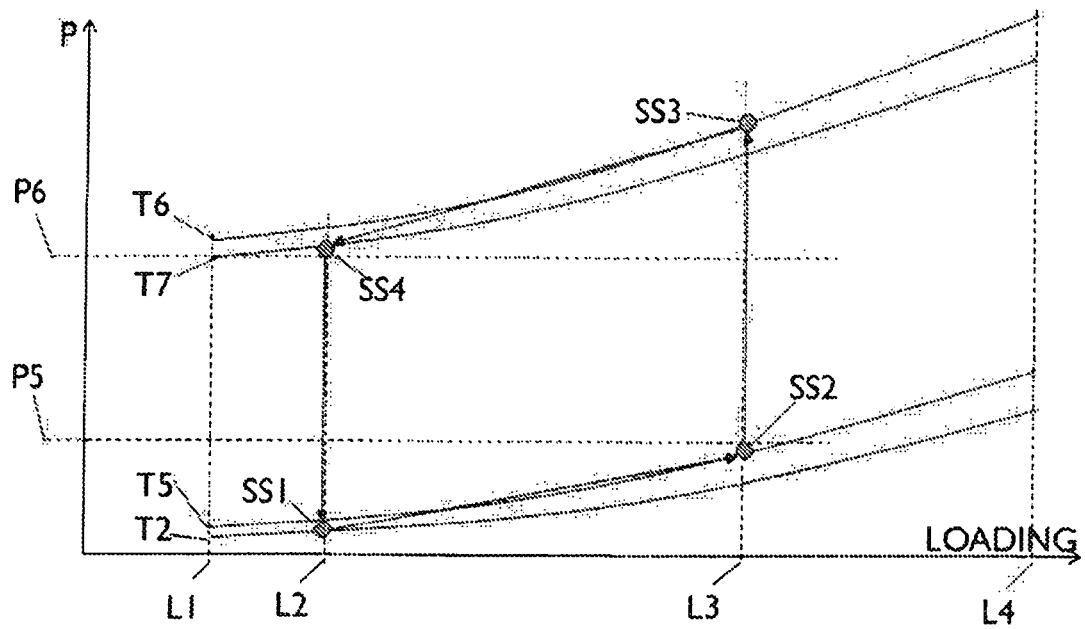
FIG. 3a represents a generalized view of the invented method from a solvent state perspective with respect to its loading vs its temperature and pressure.

Referring now to the embodiment described in FIG. 3a, representing a generalized view of the invented method from a solvent state perspective with respect to its loading versus temperature and pressure.

In this case, loading on the x axis (FIG. 3a) is defined as mol gas/mol solvent where the minimum loading, L1, is defined as zero mol gas per mol solvent and the maximum loading, L4, is the theoretical maximum of mol gas per mol of solvent. The Y axis represents pressure with P6 as the $CO_2$ pressure in the reactor and P5 as the $CO_2$ pressure in the absorber. The temperature curves T2, T5, T6 and T7 represent temperatures at the solvent states describing the cycle. The pressure defining each solvent state is defined as the partial $CO_2$ pressure in equilibrium with the solvent at that particular temperature and loading.

The cooled lean solvent at SS1 holds an inherent low partial pressure very close to vacuum at typically ambient temperature, T2, and is partially loaded, L2. The cooled lean solvent absorbs the gas resulting in a rich solvent at SS2 with higher loading, L3, and increased temperature, T5. The partial pressure, P5, of the rich solvent in this point is close to the steady state pressure reached in the absorber.

The rich solvent is heated close to heat source temperature, T6, where gas is desorbed and the solvent returns to its lean state with low loading concentration at SS4. The temperature of the lean solvent will either by the desorption cooling and/or by heat exchange, be lowered to T7.

The steady state $CO_2$ pressure in the reactor, here described by P6, is similar to the partial pressure of the solvent at SS4.

The lean solvent at SS4 is cooled by transferring its thermal energy to the cold rich solvent at SS2 and by transferring energy to an external cold source to reach the initial cold lean solvent of the cycle at solvent state SS1.

Figure 3B:
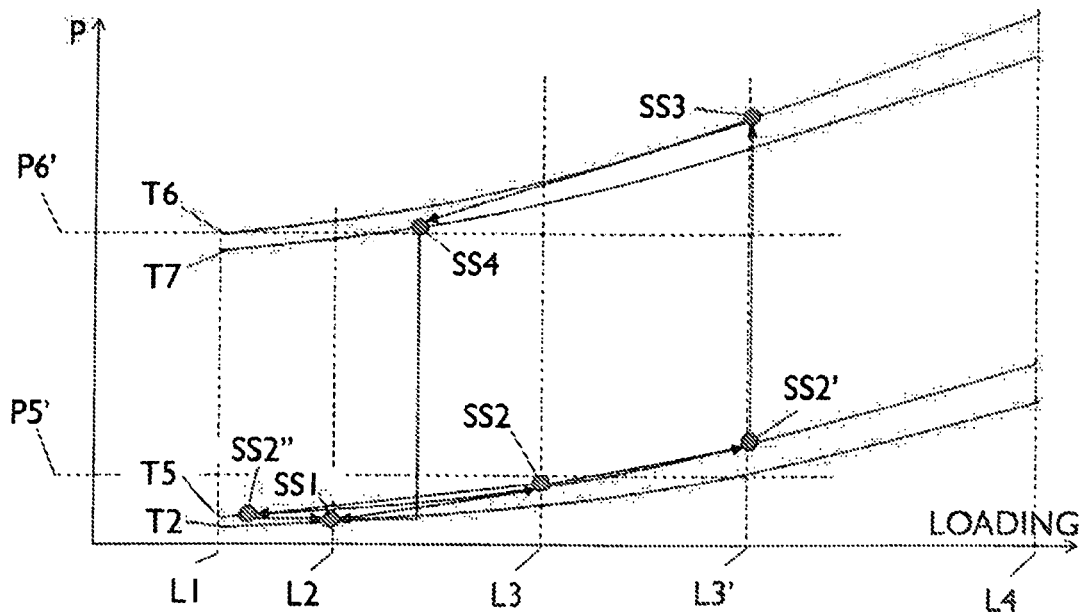
FIG. 3b represents an alternative view of the solvent state description in FIG. 3a, specifically if using a concentrator module to enrich loaded absorbent.

Referring now to the embodiment described in FIG. 3b, representing an alternative view of the solvent state description in FIG. 3a, two differences should be noted:
1. The partially loaded solvent in SS2 is separated into a solvent with even higher loading described by SS2' and a very lean solvent described by SS2".
2. The hot desorbed solvent at state SS4 is cooled and mixed with the very lean solvent in SS2" to form the initial lean state SS1.

The principle is the same as in FIG. 3a, however, a higher reactor pressure P6' and lower absorber pressure P5' compared with P6 and P5 in FIG. 3a can be achieved, using the same heat source temperature. This enables even higher conversion efficiency in the cycle, at the cost of extra equipment, such as a decanter, and its associated operating costs.

Figure 4A:
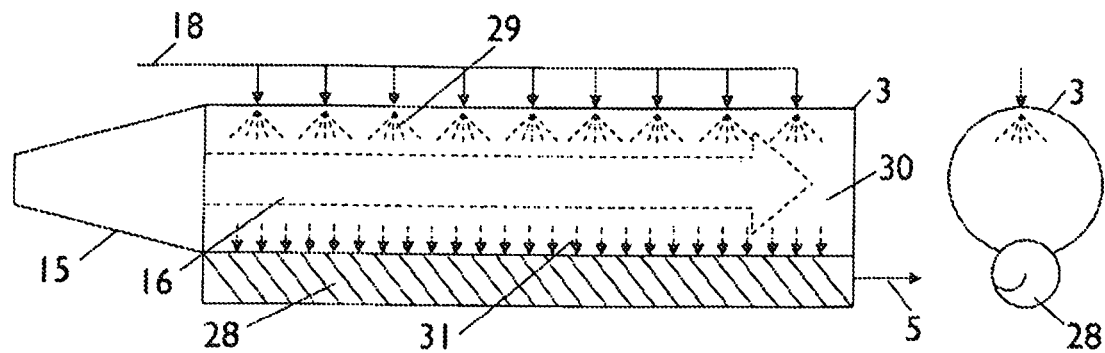
FIG. 4a represents a generalized view of the absorber system.

Referring now to FIG. 4a, representing a generalized view of the absorber system.

The objective of the absorber system is to absorb the gas 16 which has left the turbine 15 through an ideally isentropic expansion, therefore of a very low temperature, in the case of $CO_2$ as expanding gas possibly down to minus 78° C. and at a pressure below or close to 1 bar, preferably much lower than 1 bar (note: at these conditions, $CO_2$ may even co-exist as solid particles, e.g. in the form of "dry ice"). The absorbent 18 is sprayed into the absorption chamber 30 by using multiple absorbent showers 29 where the absorbent and the $CO_2$ chemically react. The product of the reaction moves down, indicated by arrows 31, by gravity to an optional transport screw 28 to exit the absorber system as a liquid $CO_2$-absorber mix 5. Also the side view of the absorber system is visualized in FIG. 4a.

The direct contact between the sprayed solvent and the gas, combined with the very fast absorption process, allows a solution with very high output velocity of the gas from the turbine, even as high as 100-200 m/s, thus enabling a very compact and low cost turbine.

Figure 4B:
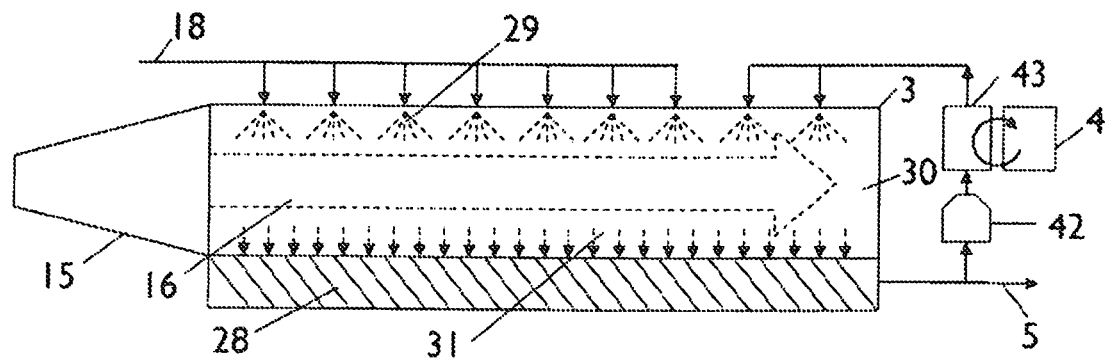
FIG. 4b represents an alternate embodiment of the absorber system in 4a with recycling of the rich solvent to increase loading concentration.

Referring now to embodiment described in FIG. 4b, representing an alternative embodiment of the absorber system shown in FIG. 4a.

An option in the absorber system is to recycle some of the rich solvent leaving the absorber 5, pressurize 42 and cool said solvent by heat exchange 43 which transfers heat to the cold source 4, and then spray said solvent back into the absorber.

The purpose of this is to increase the loading of the rich solvent to increase reactor pressure and decrease the amount of fluid transfer in the system.

In the absorber, it is desirable to obtain a $CO_2$ pressure of between 0.5 bar and 0.001 bar, preferably between 0.3 bar and 0.002 bar, even more preferably between 0.15 bar and 0.005 bar, most preferably between 0.1 bar and 0.01 bar.

Figure 4C:
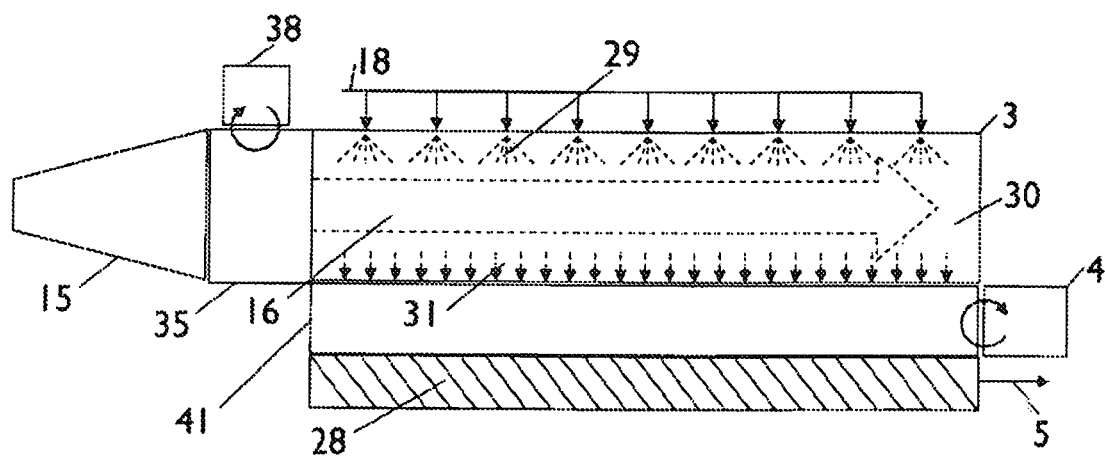
FIG. 4c represents an alternate embodiment of the absorber system in 4a with cooling extraction after turbine exit and additional cooling in the absorber to increase loading concentration.

Referring now to embodiment described in FIG. 4c, representing an alternative embodiment of the absorber system in 4a.

In order to extract valuable cooling for external purposes one option is to introduce a heat exchanger 38 in the gas flow 35 between the exit point of the turbine and the absorber.

Another option is related to FIG. 2e is to further cool the rich solvent after the spray has absorbed gas and before the rich solvent exits the absorber. The purpose of this is to increase the loading of the rich solvent to increase reactor pressure and decrease the amount of fluid transfer in the system.

Figure 5:
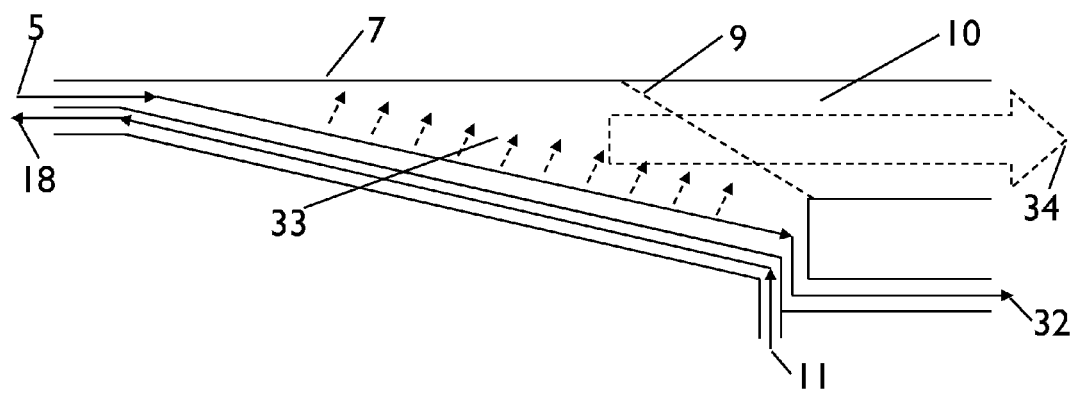
FIG. 5 represents a generalized view of the reactor system.

Referring now to the embodiment described in FIG. 5 representing the reactor, wherein the $CO_2$-absorber mix 5 enters the reactor 7 at low temperature. A hot thermal fluid 11 enters the pre-reactor and flows in a counter direction compared to the $CO_2$-absorber mix releasing the thermal energy to the mix and stripping some $CO_2$ 33 to the pre-turbine chamber 10 and exits the pre-reactor 34. The thermal fluid exits at low temperature from the pre-reactor 18. The $CO_2$ reduced mix 32 continues slightly heated to the reactor to be further stripped from $CO_2$. Optionally, a gas separation membrane 9 or filter or physical means which stop liquid droplets of absorber fluid from entering the turbine, such as a short packed distillation column or a demister, is used to ensure that no absorbent enters the pre-turbine chamber 10.

In the reactor, it is desirable to obtain a $CO_2$ pressure of between 20 bar and 0.5 bar, preferably between 15 bar and 0.8 bar, even more preferably between 10 bar and 1.2 bar.

In order to maximize energy production, it is important to avoid that a positive pressure or back-pressure is built up which would negatively impact upon the turbine's capability to produce electricity. Many expanding gases, such as water in the form of steam, will condense to a liquid with reduced volatility, especially upon simultaneous cooling. In this invention, the task of reducing the back-pressure is solved by absorbing the gas, preferably $CO_2$, in a medium which physically or chemically reacts with $CO_2$. "Reaction" is here understood as absorption or formation of covalent bonds or ionic bonds (formation of salts) or attractive van-der-Waals or similar bonds and forces which in general are characterized by an enthalpy change of at least 10 J/mol $CO_2$, and typically significantly higher, which typically would be released in the form of heat.

In the case of carbon dioxide as expanding gas, certain technological options are explored in the field of $CO_2$ capture from combustion processes. $CO_2$ can be absorbed in porous silicates, ionic liquids, but particularly suitable materials are amines, e.g. monoethanolamine, optionally diluted in water. In the $CO_2$ capture field, combustion gas is led through an absorber where $CO_2$ rich gas is mixed with amine liquid at about 40° C. and 1-2 bar. These conditions are suitable to remove essentially all $CO_2$ from the combustion gas. The $CO_2$-rich amine liquid can then be heated in a different reactor, typically up to 120° C. and 1 bar whereupon pure $CO_2$ is released from the amine. The $CO_2$-poor amine can then be recycled to the absorber stage.

This basic design is used in the invention, however, due to the low temperatures involved, the risk of formation of solid particles needs to be taken care of. Most amines (monoethylamine, piperazine, morpholine, other mono-,di- and polyamines have freezing points around 0-20° C. In the simplest embodiment, the possibly solid mixture of amine and $CO_2$ is transported from the turbine expansion area by means of solids conveyors, such as transport and compounding screws, also to ensure that reaction can take place between amines and $CO_2$. Chemical bonding between $CO_2$ and amine ensures low volatility of $CO_2$ even at temperatures up to 40° C., as discussed above. From an engineering point-of-view, preferably liquid mixtures are handled at that stage. A practical solution is provided by mixing the amine in a chemically inert liquid with a very low melting point, such as silicone oil. Pre-dispersed amine in silicone oil is thus a liquid medium which can absorb $CO_2$ efficiently and can be handled at all prevalent conditions downstream of the turbine as (albeit) viscous liquid.

Using amines dispersed in low-melting liquids such as silicone oils provides thus the opportunity to use very different amines for the $CO_2$ absorption. In particular, it is desirable to use amines which react with $CO_2$ less violently or with less heat production (less than 1900 kJ/kg $CO_2$, see reference below) than monoethylamine (MEA). It should be noted that these energy values are approximate and dependent on process parameters such as water content, flow, contact time (as the chemistry may change, see references such as Edward Rubin and Arnand Rao in DOE/DE-FC26-00NT 40935, page 18, Gary Rochelle, "$CO_2$ Capture by aqueous absorption", Dept of Chemical Engineering, University of Texas, and similar public documents. Thus, different energies for the $CO_2$ absorption in various amines are provided in the literature ranging between 100-4000 kJ/kg $CO_2$.) Alternatives to amines are mentioned below, but the general principle disclosed here shall incorporate amines, zeolites, microporous materials, "chill ammonia" or ammonium bicarbonate and similar systems which bind $CO_2$ at temperatures between −80 and +60° C., and are able to release $CO_2$ at higher temperatures. Using more bulky or sterically hindered amines is preferred at that stage. Other suitable amines are e.g. DEA (diethanolamine), DGA (diglycolamine), DIPA (diisopropanolamine), TEA (triethanolamine) and others, alone or in mixtures, typically mixed with water or alcohols. Particularly suitable amine systems are described in the following publications which are enclosed by way of reference and listed at the end of the description.

The chemicals disclosed include such amine or $NH_3$ systems which effectively absorb $CO_2$ at low temperatures and are able to release $CO_2$ at temperatures partly already in the order of 80-100° C. which is particularly preferred if hot water generated by solar heating, or e.g. industrial waste heat, is used as thermal source.

Various embodiments and engineering modifications of the basic invention are conceivable which all use the principle of chemical and temporary absorption of $CO_2$ gas in an alkaline absorber medium or liquid. As an example, the heater/booster can be operated batchwise by releasing some pressurized $CO_2$ (e.g. through a separate small turbine) from a receiving vessel or pre-reactor which can be separated from the main reactor via valves. Said pre-reactor can be filled with $CO_2$-rich absorbent which flows subsequently to the hot section for separation into gas and $CO_2$-lean absorbent.

The thermal working fluid according to the invention is preferably operable between −70° C. and 150° C., more preferably between −30° C. and 140° C., even more preferably between −10 and 130° C., and most preferably between 0° C. and 100° C.

EXAMPLES OF THE INVENTION

Examples are given in the following section, relating to the different sections of the power cycle, i.e. absorber, pumps, heat exchangers, stripper, reactor or desorber, expansion units including turbines and extra equipment and chemicals. These examples contain preferred embodiments.

Absorber and chemicals: as described, the working gas exiting the expansion machine is absorbed chemically at this stage. To assess the absorption speed of $CO_2$ by ammonia and amines including MEA, MDEA, PZ, DETA and many more, two different sets of experiments were carried out. For stationary experiments, a 2 liter stainless steel reactor was charged with typically 100 g of amine, additives and 1-5 bar of $CO_2$ gas. The following table shows typical weight increases and further comments. In general, the following properties are preferred: high capacity, high $CO_2$ content relative to amine or amine plus solvent mass, fast absorption, low heat development during absorption, low viscosity of the final product, no formation of salts unless those can be pumped, desorption possible at low temperature and without foaming, low toxicity, low price, good thermal stability, low vapour pressure at desorption temperature. Some chemicals such as ammonia, amines of low molecular weight such as diethylamine evaporate and form salt on reactor walls. Due to their high vapour pressure, they would need to be handled at low temperature. Especially ammonia is difficult to handle as deposits would be formed during the expansion to low temperature in the turbine. Dialkylamines such as Dibutylamine (DBA), alone or mixed with water or alcohols such as 1-hexanol, tertiary amines such as MDEA and secondary amines such as DETA and combinations of those, such as 5-10% piperazine or DBA, 60% MDEA and rest water, turned out to meet most of the above mentioned requirements. Other useful amines are described in the doctoral thesis of M. Sc. Yudi Halim Tan, "Study of CO-absorption into thermomorphic lipophilic amine solvents", Dortmund, 2010, and therein cited literature. Also stronger bases, such as reported by David Heldebrant (Pacific Northwest National Laboratory), including guanidine (TMG), amidine (DBU) and Barton's and Hünig's base can be useful despite their higher price, mainly as they can bind $CO_2$ in combination with alcohols by way of carbonate formation.

| Absorber chemical, additive | Results and comments |
|---|---|
| 25% $NH_3$ in water | Very fast weight increase, high $CO_2$ pressure at low desorption temperature, but salt formation in reactor and high $NH_3$ volatility |
| 12% $NH_3$ in water | Very fast weight increase and salt formation |
| 25% MEA in water | Useful for desorption above 120-150° C. |
| 50% MEA in water | Useful for desorption above 120-150° C. |
| Pure MEA | Very fast absorption, useful for high temperature desorption |
| Pure MDEA | MDEA needs water as co-reagent |
| 50% MDEA in water | Slow absorption, but favourable desorption |
| MDEA, sec amine, water | Piperazine most useful additive |
| 100% DETA | Fast absorption, useful at temperatures above 120° C. |
| 50% DETA in water | As 100% DETA |
| Dibutylamine DBA | See table below, not volatile |
| Dibutylamine in water | See table below |
| Diethylamine, DEA | See $NH_3$, challenging due to high volatility |
| Dihexylamine, DHA | See DBA, even less volatile |
| Diisobutylamine, Diiba | As DBA, stronger tendency to form crystalline $CO_2$-adducts |
| Dibutylamines in alcohol such as 1-hexanol or 1-butanol | Weight increase after reaction with $CO_2$ indicates formation of carbonates (1 mol/mol) rather than carbamates (only 0.5 mol $CO_2$ per mol amine), desorption at low temperature possible |

Summarizing the selection of chemicals, many amines are suitable for the process, including one or more the following: MEA (monoethanol-amine), morpholine, piperazine, MDEA (methyl-diethanolamine), DEA (diethanolamine), DGA (diglycolamine), DIPA (diisopropanolamine), TEA (triethanolamine), DETA (diethylenetriamine), alone or mixed with water or alcohols, or other amines such as amines with siloxane functional groups, or mixtures thereof including biphasic and thermomorphic amine mixtures, or amines coupled to zeolites or silicas, including mixtures with water and/or alcohols, or ammonia ($NH_3$) or aminoacid derivatives, or ionic liquids, alone or in combination with freezing point depressants or chemicals which allow a cold slurry to be transported by mechanical means. Said chemicals may be selected from the group consisting of silicone oils, water, alcohol, oil, and defoamer. MEA and DETA are useful only for $CO_2$-desorption at temperatures significantly above 100° C., on the other hand a very low pressure can be obtained in the absorber. The absorption enthalpy of MEA and DETA is rather high, therefore other amines, such as MDEA in combination with piperazine and water, or alkylated amines such as DBA, as discussed above, are preferred chemicals from a desorption temperature, absorption enthalpy, viscosity and reaction speed point-of-view.

Preferably the absorbent is selected from the group consisting of DEA (diethanolamine), MEA (monoethanolamine), morpholine, piperazine, MDEA (methyldiethanolamine), DGA (diglycolamine), DIPA (diisopropanolamine), TEA (triethanolamine) alone or mixed with water or alcohols, lipophilic amines such as dialkylamines where alkyl may be methyl, ethyl, and preferably propyl, butyl, sec-butyl and iso-butyl, pentyl, hexyl or alkyl groups with more than six C atom, mixtures thereof including biphasic and thermomorphic amine mixtures, amines coupled to zeolites or silicas, including mixtures with water and/or alcohols such as butanol, hexanol and glycols, aminosilicones, guanidine, amidine, aminoacid derivatives, ionic liquids, alone or in combination with freezing point depressants or chemicals which allow a cold slurry to be transported by mechanical means, including silicone oils, and where amines are preferred which have lower absorption enthalpies for the $CO_2$-amine reaction than MEA (monoethanolamine) and which have boiling points at 1 bar above 120° C.

For dynamic experiments, a 12 liter flow reactor (ca 1 m length) equipped with viewing glasses, collection vessels for amine, mass flow controller for $CO_2$, membrane pump for amine flow, pressure and temperature sensors was used. The reactor can be purged and loaded with e.g. 1.2 bar $CO_2$ upon which amine is pumped into the top of the reactor in small droplets. The absorption kinetics (primarily pressure reduction to millibar level) is followed with millisecond resolution. The amine is collected for analysis, or re-used directly after charging the reactor with $CO_2$, to study the absorption kinetics of partially CO2-loaded amine. In a variation of the experiment, $CO_2$ gas is flowing e.g. at 2 liter gas (STP, standard temperature and pressure) per minute or more, amine is sprayed into the reactor e.g. at 0.5 liter per minute, and the achievable vacuum level is recorded. Typically, 500 ml of useful and preferred amines such as DETA or DBA absorb 16 liter STP $CO_2$ within 3-10 seconds under these conditions. It is desirable to increase the total surface of the absorbing solution by separating the amine liquid into many small droplets. For this purpose, amine is sprayed into the reactor. The optimum average droplet size depends on the chemical used and the reactor design, however, values between 0.01 and 5 mm, preferably between 0.025 and 2 mm, even more preferably between 0.05 and 0.5 mm, and most preferably between 0.1 and 0.25 mm, are highly useful. Much smaller droplets do not give higher absorption speed, balancing the higher pump power needed to create droplets, too large droplets do not absorb fast enough if vacuum levels of under 100 mbar, or under 50 mbar or under 20 mbar are desired.

Phase transfer mode of operation: Certain amines such as dibutylamine (DBA) are not or only sparingly water-soluble, however, carbamates or bicarbonates or carbonates formed by reaction with $CO_2$ are water-soluble, alternatively, they tend to form gels or precipitates in the water phase. Other amines form salts upon reaction with $CO_2$ which are difficult to handle. In such cases, a special mode of operation can be applied involving phase transfer.

As an example, DBA and water are sprayed into the absorber to capture $CO_2$, the resulting mixture will phase-separate into an upper phase of essentially pure DBA and a lower phase of carbamates, carbonates and other salts dissolved or dispersed in water. The amine can be recycled directly to the absorber, and the ideally concentrated water solution is pumped to the desorber. One advantage of this operation is that water absorbs heat such that cooling directly in the absorber can be avoided if desired. Concentration of the aqueous phase (or polar phase, if a solvent different from water is chosen) can be done by centrifuging or decanting. As an example, the complex of DBA and $CO_2$ forms a gel-like precipitate in the water phase. A mixture of DBA and $CO_2$ containing 40% of the theoretical maximum loading of CO2 (0.5 mole $CO_2$ per mole DBA) is treated with the same volume of water. The gel forming in the water phase is separated and found to contain DBA with a loading degree of 82% (=0.82*0.5 mole $CO_2$ per mole DBA). This enriched mixture generates a significantly higher $CO_2$ pressure upon heating than the mixture of 40% loading degree: the enriched mixture generates 4.2 bar CO2 pressure already at 70° C. whereas the 40% mixture generates 2.5 bar at 90° C. Enrichment of the amine-$CO_2$ complex is thus a highly useful operation to be performed after the absorption stage and prior to pumping the loaded rich amine to the desorber.

Absorption heat: it is normally desirable to cool the $CO_2$-loaded amine, either by internal heat exchangers or cooling of the absorber walls. This limits excessive heating of absorbing amine and limits the $CO_2$ pressure in the absorber. In general, as the pressure ratio of $CO_2$ before versus after the turbine is determining the electricity output, it is advisable to strive after minimum pressure in the absorber, therefore some cooling is often preferred. One elegant way of cooling is addition of water, and this can have further benefits for enrichment of $CO_2$-loaded amine, see above. Presence of water may cause a significant partial pressure in the absorber, therefore polar alcohols, oils and other liquids with higher boiling point than water are alternatives. The heat can be disposed of, or can be used to pre-heat the rich amine prior to entering the desorber.

Desorber or reactor: for experimental studies, a 150 ml steel bottle with openings/valves for filling liquid and connections to a vacuum Rump, temperature sensors for gas and liquid phase and a manometer was used. Typically, 50 ml of $CO_2$-loaded amine was charged to the reactor which was evacuated, in the case of volatile amines after cooling. The bottle was placed in an oil heating bath. The pressure is recorded as function of the temperature. In a variation of the experiment, the bottle is heated to a given temperature, e.g. 90° C., and the equilibrium pressure is recorded. A certain amount of gas is released, e.g. by reducing the pressure from 4 to 2 bars or similar, and the new resulting equilibrium pressure is recorded. This experiment yields, after calculation of the $CO_2$ content of the liquid phase, a diagram of the $CO_2$ pressure at a given temperature as a function of the $CO_2$ content of the amine. The remaining amine mass is weighed in order to check the mass balance. Typically, the maximum achievable pressure at given temperature decreases with decreasing $CO_2$ loading. Desorbing can be realized by trickle flow reactors, spraying rich amine into a heated reactor or other known configurations. Particularly useful for efficient pre-heating and heat transfer is the technology known as flash evaporation where by the liquid rich amine is heated under pressure, avoiding gas formation in the heat exchanger. This can elegantly be combined with spraying $CO_2$-rich amine into the desorber. Foaming can be controlled by the choice of chemicals and solvents, and by engineering measures such as demisters. In larger scale operation, it is known and useful to employ a booster, reboiler or superheater, both to supply extra heat to the working gas and to strip further $CO_2$ from already lean solvent. This reboiler may be integral part of the reactor or a separate vessel, and it may for practical purposes have the same or a supplemental heat source.

In the following summary table, experimental data are given for various amine systems which are useful in practicing the invention. The focus here is on systems which are useful for extracting energy from relatively low temperatures, such as below 100° C.

| Chemicals | $CO_2$-pressure, temperature | comments |
| --- | --- | --- |
| MEA | 1.8 bar at 136° C. | Ca. 90% loaded High viscosity of loaded MEA can be reduced by adding e.g. paraffin or ester oil. |
| MDEA, 5% piperazine, 30% water | 6 bar at 75° C. | 43% loaded, ca 57 kJ/mol (slope on van't Hoff plot) |
| MDEA, 10% piperazine, 30% water | 4.7 bar at 80° C. | Ca 36% loading, ca 63 kJ/mol |
| MDEA, 12% DETA, 20% water | 1.4 bar at 95° C. | Ca 24% loading |
| Pure DBA | 5.5 bar at 75° C. | Ca 90% loading, 54 kJ/mol |
| DBA-$CO_2$ adduct, powder dispersed in water (50/50 wt) | 2.7 bar at 90° C. 1 bar at 75° C. | Ca. 40% loaded, 73 kJ/mol |
| As above, but solids separated by centrifuging | 4.1 bar at 68° C. | Composition 80% amine, 20% water, slope 52 kJ/mol |
| DBA | 3.2 bar at 90° C. | 40% charged, 90 kJ/mol |
| DBA/MDEA/water 32 parts/66 parts/30 parts | 4.6 bar at 75° C. | 10% wt total loading, ca. 50 kJ/mol |
| Diisobutylamin Diiba 70%, 30% water | | Gives salt at loading above 50% |
| Diiba 20%, water 80% | 3.6 bar at 75° C. | Probably forming carbonates rather than carbamate |
| 43% DBA, 57% water | 4.0 bar at 75° C. | 86% loading, probably mainly (bi-)carbonate |
| 48% DBA, 52% water | 3.4 bar at 75° C. | Ca. 72% loading, 44 kJ/mol |
| 50% DBA, 50% 1-butanol | 2.6 bar at 80° C. 3.6 bar at 88° C. | Ca. 70% loaded, calculated as carbonate, ca. 70 kJ/mol |

In the case of DBA, it was found that the chemical complex of DBA and $CO_2$ can be enriched by way of centrifuging. Technically, this can be done continuously using a decanter. Also, the solid residue can be extracted using a screw transportation device. Thus, an absorption mixture containing amine, $CO_2$ and a solvent such as water or alcohol can be moderately loaded in the absorption section, making sure that the equilibrium pressure can be kept e.g. below 0.1 or below 0.2 bar, and the mixture can be subjected to a separation or enrichment process whereupon the lean liquid is recycled to the absorption and only the fraction rich in amine-$CO_2$ complex is forwarded to the desorption. A comparison of line 6 and 7 in the table above shows that significantly higher pressures can be obtained using this extra separation step. This is especially useful if a low desorption temperature such as 70° C. is required. At temperatures above 90° C., it is normally not advisable to employ this extra step. The expert will realize that the choice of amine, co-solvent and concentrations depends on how the system needs to be balanced in terms of flows, temperatures and so forth.

The extra separation step may be selected from the group consisting of phase separation, decanting and centrifuging, and wherein $CO_2$-loaded absorbent is split into at least two fractions of which the fraction which is richest in $CO_2$ is transferred to the reactor for splitting into $CO_2$ gas and lean absorbent.

General remarks: on the basis of the following tables, the absorption and desorption process is shown, and the difficulties of designing an efficient process are highlighted. Table 1 shows the equilibrium $CO_2$ pressure above mixtures containing dibutylamine (DBA) as function of the temperature, for two different loading levels of $CO_2$ (loading level=percentage of maximum $CO_2$ stored in DBA, 100%=0.5 mole $CO_2$ per mole amine). It is apparent that the $CO_2$ pressure increases as the loading level increases (at a given temperature). (Note that the slope of the corresponding logarithm of pressure versus 1/T gives a measure of the absorption enthalpy.) These results give guidance for both absorber and desorber design. As example, if the amine (DBA) is loaded to 40% in the absorber at 50° C., a pressure of 0.44 bar will prevail. In the desorber, a maximum pressure of 2.2 bar can be generated at 90° C.

TABLE 1

CO$_2$ equilibrium pressure as function of temperature, for two loading levels of DBA/CO$_2$

| ° C. | p-20% | p-40% |
|---|---|---|
| 20 | 0.05 | 0.08 |
| 30 | 0.06 | 0.16 |
| 40 | 0.08 | 0.28 |
| 50 | 0.12 | 0.44 |
| 60 | 0.2 | 0.66 |
| 70 | 0.3 | 0.98 |
| 80 | 0.46 | 1.46 |
| 90 | 0.62 | 2.2 |
| 100 | 0.84 | 3.2 |
| 110 | 1.12 | 4.3 |

Table 2 shows the equilibrium CO$_2$ pressure at two different temperatures, also for a mixture containing DBA. In general, the equilibrium pressure increases with CO$_2$ loading at a given temperature. It is apparent that 100% loading of DBA even at 20° C. is not achievable if a very low pressure shall be maintained in the absorber. (Note that the values given are approximative: DBA can be loaded to 100% at CO$_2$ pressures above 1 bar CO$_2$, and the thus obtained mixture is found to be meta-stable. It can be stable for days as low viscosity liquid, but can also crystallize with concurrent loss of CO$_2$ and slight auto-heating.) The values for 90° C. show that the desorption of CO$_2$ from the amine-CO$_2$ complex will generate e.g. 3.3 bar if 70%-loaded DBA is heated to 90° C. As the loading level decreases to 50%, the resulting pressure will be reduced to 1.4 bar.

In can be very beneficial to avoid or minimize the use of water in the process. As an example, water vapor contributes significantly to the equilibrium pressure in the absorber. Therefore, paraffin or ester oils are useful alternative diluents for amines which, in pure form, upon reaction with CO$_2$ turn into viscous liquids. This mode of operation eliminates also the risk of ice formation on turbine blades.

Table 1 and 2 show that in practice a mode of operation is chosen where amine is loaded e.g. from 20 to 50% at e.g. 25° C., said 50% mixture is heated to 90° C. in the desorber where CO$_2$ pressure is generated until the amine is again at a loading level of 20%. After heat exchanging, the amine cooled to 25° C. is re-used in the absorber. In a modified mode of operation, the amine-CO$_2$ mixture in the absorber is contacted with a polar solvent, preferably water, in order to regenerate unreacted amine and to produce a phase containing water and rich amine (see section of phase transfer). Unreacted amine is re-used in the absorber, and water is removed from the amine/water phase, preferably by centrifugation or decanting, in order to enrich the amine-CO$_2$ complex. This mode of operation allows maximum utilization of amine and enables maximum pressure generation in the desorber as highly enriched phases can be used in the desorber. The general schemes of cycling and loading amines with CO$_2$ at low temperatures, and desorbing CO$_2$ at elevated temperature are shown further in FIGS. 3a and 3b, whereby 3b shows the process including enrichment of partially loaded amine.

TABLE 2

CO$_2$ equilibrium pressure at two temperatures, for various CO$_2$ loading levels (DBA mixture)

| % CO$_2$ | p 20 deg C. | p 90 deg C. |
|---|---|---|
| 20 | 0.05 | 0.4 |
| 30 | 0.06 | 0.56 |
| 40 | 0.08 | 0.8 |
| 50 | 0.12 | 1.4 |
| 60 | 0.2 | 2.2 |
| 70 | 0.3 | 3.3 |
| 80 | 0.46 | 4.6 |
| 90 | 0.62 | 5.9 |
| 100 | 0.88 | 8 |

Turbine and other expansion machines: the energy content of CO$_2$ at given temperatures and pressures can be calculated using published data (Mollier diagram). Turbines and turbine efficiencies can be calculated using published information. Depending on the choice of chemicals and the heat source, pressures upstream of the turbine of 1-20 bar, typically 2-4 bar are achieved. On a more detailed level, it is desired to obtain a CO$_2$ pressure in said reactor of between 20 bar and 0.5 bar, preferably between 15 bar and 0.8 bar, even more preferably between 10 bar and 1.2 bar, and to obtain a CO$_2$ pressure in said absorption system of between 0.5 bar and 0.001 bar, preferably between 0.3 bar and 0.002 bar, even more preferably between 0.15 bar and 0.005 bar, most preferably between 0.1 bar and 0.01 bar.

At the same time, a useful pressure ratio upstream/downstream of the turbine of between 5-40, preferably between 10-25 is desired. This means that the pressures in the reactor and in the absorber are connected. A useful combination of those two pressure values is given by a steady-state pressure of 3 bar in the reactor and 0.2 bar in the absorber, or 2 bar in the reactor and 0.1 bar in the absorber (pressure ratio 15).

As an example, a pressure ration between 12 and 25 is useful if the heat source supplies heat between 90 and 120° C. If the temperature of the heat source is above 120° C., a pressure ratio of 20-30 or even 20-40 is preferred. Under 90° C., a pressure ratio of 5-15 is preferred. Further, in a configuration where the pressure quota or ratio is larger than what is needed to isentropically expand the gas to its triple point temperature (−78° C. for CO$_2$), a reheat system that heats the gas between the expansion stages in the turbine may be preferred to further increase efficiency and provide more external cooling.

The final choice depends on the absorbent used and is found by experimentation and optimization, balancing all parameters such as loading level, temperatures and so forth, as discussed above.

The high absorption speed of CO$_2$ into the small droplets which are sprayed into the absorber means that the size of the turbine can be reduced. The exit speed of CO$_2$ can be very high, and the gas flow can be optimized together with the flow of droplets by way of computer simulation. The cold gas exiting the turbine can transfer heat to a heat exchanger system, generating a cold flow, without impacting the absorption speed significantly. The expansion machine preferably includes at least one isentropic gas expansion turbine.

Instead of a turbine, different expansion machines (Wankel type, Stirling, piston arrangement) can be used, which is useful if only moderate pressures of CO$_2$ can be achieved. CO$_2$ fills the cylinder volume in such a case while the piston is moving and thereby increasing the cylinder volume. The gas which enters the cylinder is driving the piston. Subsequently or simultaneously, lean amine is sprayed into the cylinder thereby causing a pressure reduction. This pressure reduction is the second driving force of the expansion machine and causes the reverse movement of the piston. The rich amine is pumped out of the cylinder, and the cycle is repeated. Suitable valves, camshafts and the like control the process. In a sense, this expansion machine which can drive a generator for electricity generation, is a reverse of a 2-stroke combustion engine. The arrangement is useful if complete discharge of the rich amine is desired, as the machine can accommodate lower pressures. A plurality of cylinders can be used for continuous operation.

Heat exchangers, heating sources and cooling: The thermal energy required to drive the process may be provided by solar energy or industrial or waste heat. The physical medium or working fluid may be water which is useful up to 90° C., water steam, oil or other heat transfer fluids, suitably stabilized where required. A storage unit 2 for hot medium may be part of the system such that the process can be operated if the heat source is not available for shorter periods, e.g. night operation of a solar-driven process. In the case of a solar-driven process, a secondary heat source may be useful to provide heating above 90° C., 100° C., 110° C. or 120° C., and useful instruments are concentrating solar collectors as in heat pipes or parabolic trough or Linear Fresnell reflectors or Micro CSP's or Parabolic dish collectors or an auxiliary combustion based heat source. Also waste heat based process may benefit from an auxiliary secondary heat source, preferably energetically coupled to the gas temperature booster to provide energy to increase the temperature of the working gas passing through the gas temperature booster. The solar system may thus comprise a thermal energy source given by a solar thermal collector assembly within which a thermal working fluid is heated, alternatively heat sources such as industrial waste heat or heat from engines or geothermal heat. The solar thermal collector for heating a thermal working fluid will have a collector fluid inlet and a collector fluid outlet, a higher temperature storage container connecting the collector fluid outlet to a heated fluid inlet of the reactor, and a lower temperature storage container connecting the collector fluid inlet to a cooled fluid outlet of the reactor. Further, the system given by the solar thermal collector assembly and the reactor create a closed loop heating system for supplying heat to the reactor.

Heat exchange is preferred or necessary to optimize the performance and efficiency of the system between lean absorbent leaving the reactor and rich absorbent flowing into the reactor. Heat may be removed from the system during or after the absorption stage or from lean absorbent leaving the reactor.

BENEFITS OF THE INVENTION

An overall view of the application benefits are:
1. Enabling cost efficient electricity (and cooling) production using excess heat from industrial processes
2. Enabling cost efficient electricity (and cooling) production using geothermal heat form low temperature wells
3. Enabling low temperature solar thermal power production for large and small scale with the large benefit of storing the thermal energy in water, enabling electricity production 24 hours per day and 7 days per week (24/7).
4. Enabling cost efficient heat to electricity conversion from heat producing processes
5. Enabling compact heat recovery to electricity for the transportation industry
6. Enabling compact heat recovery to electricity from gas turbines
7. Enabling compact heat recovery to electricity from combustion engines used for land and maritime transportation
8. Enabling additional production of electricity from bottoming cycle in power plants An overall view of the product benefits compared to other solutions is:
1. Very high conversion efficiency
2. Very compact and scalable from household size to large systems
3. Low pressures and temperatures. No use of ozone-depleting gases or gases with greenhouse potential, no hazardous or rare materials involved making products completely safe and environmentally friendly
4. Efficient and simple co-generated electricity and cooling An overall view of the cycle benefits compared to other solutions is:
1. Large temperature difference and pressure quota over the expansion machine
2. Highly efficient entropy reduction
3. Very efficient pressure reduction after the expansion machine
4. Very compact turbine due to extremely high allowed gas exit velocity
5. Working pressure and temperatures balanced around ambient temperature and atmospheric pressure
6. Use of benign organic compounds with carbon dioxide as working gas
7. Possibility of solvent concentration enabling high efficiency at very low heat source temperatures

REFERENCES

1. WO 2008/01527 A1 by David Agar et al (Separating $CO_2$ from gas mixtures", 2. A mix of DPA and A1 as absorption activator, and e.g. DMCA and EPD as regeneration promoter, as disclosed in "Improvement of lipophilic amine based thermomorphic biphasic solvents for energy efficient carbon capture", by Jiafei Zhang and David Agar, TCCS-6 conference presentation, Trondheim 15 Jun. 2011, 3. Chemical Engineering Research and Design, 89 (2011), p. 1190-1196 (Jiafei Zhang et al.), 4. WO 2007/001190, Svendsen et al., 5. $CO_2$ Absorption in biphasic solvents with enhanced low temperature solvent regeneration, by Jiafei Zhang, David W. Agar, Xiaohui Zhang and Frank Geuzebroek, Energy Procedia (2010), see www.sciencedirect.com, 6. Distillation Absorption 2010, "Carbon dioxide absorption into biphasic amine solvent with solvent loss reduction", Jiafei Zhang et al., p. 169-175, 7. "Nye effective absorbenter for $CO_2$ fangst, SOLVit SP4", Hallvard F. Svendsen, contribution to the CLIMIT seminar, 12-13 Oct. 2010, Trondheim, Norway, 8. Niklas Hedin et al., Langmuir 2011, 27, 3822-3834, "Carbon dioxide sorbents with propylamine groups . . . ", especially FIG. 10 and relevant text on Davisil silica modified with APTES, 9. Niklas Hedin et al., Nanoscale 2010, 2, 1819-1841, "Sorbents for $CO_2$ capture from flue gas . . . ". 10. Robert J. Perry et al., "Aminosilicone solvents for $CO_2$ Capture", ChemSusChem 2010, 3, 919-930 (DOI 10.1002/cssc. 201000077), 11. Victor Darde et al., Chilled ammonia process for $CO_2$ capture", International Journal of Greenhouse Gas Control 4 (2010), 131-136, 12. Patents and patent applications US 2008/0098892 and US 2008/0025893.

The invention claimed is:

1. A method for producing electrical energy using an essentially closed loop system comprising the steps of:
   providing a reactor (7);
   accessing at least one external heat source (1) for providing thermal energy to the essentially closed loop system, the at least one external heat source being a low temperature heat source providing thermal energy at up to 150° C.;
   transferring thermal energy from the at least one external heat source to the reactor (7);
   providing an absorber system (3) for chemically absorbing carbon dioxide (CO2) into an absorbent liquid to provide a mix of CO2 gas and liquid absorbent (gas-absorbent mix) and to generate a low pressure;
   providing at least one pump device (6) for increasing the pressure of said gas-absorbent mix and allowing transfer of pressurized gas-absorbent mix to the reactor (7);
   provding a separator downstream of the pump device for separating said gas-absorbent mix and recycling part of said gas-absorbent mix to said absorber system;
   using thermal energy from the said heat source (1) to heat the pressurized gas-absorbent mix at the reactor, thereby splitting the pressurized gas-absorbent mix into a heated and pressurized CO2 gas and a heated absorbent liquid as output of the reactor;
   providing an expansion machine (15) with a generator (23) for producing electricity by expanding the heated and pressurized CO2 gas from the said reactor (7) into a low temperature CO2 gas by using the low pressure generated in the said absorber system (3);
   providing a pipe system that leads the said heated absorbent liquid exiting the reactor (7) and the low temperature CO2 gas exiting the expansion machine (15) to the said absorber system (3) so the CO2 gas is chemically re-absorbed into the heated absorbent liquid for the process to start over in a reversible reaction with the CO2 gas absorbed into the heated absorbent liquid in said absorber system (3);
   using said heated and pressurized CO2 gas to operate said expansion machine within a temperature interval between −78° C. and plus 150° C.;
   using in the absorber system a material capable of binding CO2;
   obtaining a CO2 pressure in said reactor of between 20 bar and 0.5 bar;
   obtaining a CO2 pressure in said absorber system of between 0.5 bar and 0.001 bar;
   the closed loop system continuously recirculating the CO2 gas without its release from the system; and
   accelerating absorption and mass transfer of CO2 into the absorbent by providing the liquid absorbent in the form of droplets by spraying the liquid absorbent into the absorber such that the gas exiting the expansion machine can be in contact with a large surface constituted by the plurality of absorbent droplets, the droplets having a diameter of between 5 mm and 0.01 mm.

2. The method as claimed in claim 1, wherein the droplets have a diameter of between 2 mm and 0.025 mm.

3. The method as claimed in claim 1, wherein the droplets have a diameter of between 0.5 mm 0.05 mm.

4. The method as claimed in claim 1, wherein the droplets have a diameter of between 0.25 mm and 0.1 mm.

5. The method as claimed in claim 1, wherein the at least one heat source (1) provides thermal energy at up to 120° C.

6. The method as claimed in claim 1, wherein the transferring step comprises transferring thermal energy from the at least one external heat source directly to the reactor (7).

7. A method for producing electrical energy using an essentially closed loop system comprising the steps of:
   providing a reactor (7);
   accessing at least one external heat source (1) for providing thermal energy to the essentially closed loop system, the at least one external heat source being a low temperature heat source providing thermal energy at up to 150° C.;
   transferring thermal energy from the at least one external heat source to the reactor (7);
   selecting the heat source (1) from the group consisting of solar energy, waste heat from power plants or industrial processes, waste heat from motors or engines, geothermal heat, heat from combustion of organic materials, and waste heat from high temperature power generation cycles;
   providing an absorber system (3) for chemically absorbing carbon dioxide (CO2) into an absorbent liquid to provide a mix of CO2 gas and liquid absorbent (gas-absorbent mix) and to generate a low pressure;
   providing at least one pump device (6) for increasing the pressure of said gas-absorbent mix and allowing transfer of pressurized gas-absorbent mix to the reactor (7);
   providing a separator downstream of the pump device for separating said gas-absorbent mix and recycling part of said gas-absorbent mix to said absorber system;
   using thermal energy from the said heat source (1) to heat the pressurized gas-absorbent mix at the reactor, thereby splitting the pressurized gas-absorbent mix into a heated and pressurized CO2 gas and a heated absorbent liquid as output of the reactor; —providing an expansion machine (15) with a generator (23) for producing electricity by expanding the heated and pressurized CO2 gas from the said reactor (7) into a low temperature CO2 gas by using the low pressure generated in the said absorber system (3);
   providing a pipe system that leads the said heated absorbent liquid exiting the reactor (7) and the low temperature CO2 gas exiting the expansion machine (15) to the said absorber system (3) so the CO2 gas is chemically re-absorbed into the heated absorbent liquid for the process to staff over in a reversible reaction with the CO2 gas absorbed into the heated absorbent liquid in said absorber system (3);
   using said heated and pressurized CO2 gas to operate said expansion machine within a temperature interval between −78° C. and plus 150° C.,
   using in the absorber system a material capable of binding CO2, —obtaining a CO2 pressure in said reactor of between 20 bar and MOS bar,
   obtaining a CO2 pressure in said absorber system of between 0.5 bar and 0.001 bar, and
   the closed loop system continuously recirculating the CO2 gas without its release from the system.

8. The method as claimed in claim 7, wherein the gas-absorbent mix is operable between −70° C. and 150° C.

9. The method as claimed in claim 8, wherein the gas-absorbent mix is operable between −30° C. and 140° C.

10. The method as claimed in claim 8, wherein the gas-absorbent mix is operable between −10° C. and 130° C.

11. The method as claimed in claim 8, wherein the gas-absorbent mix is operable between 0° C. and 100° C.

12. The method as claimed in claim 7, further comprising the steps of:
  transferring heat using a heat exchange system (12) from the heated absorbent liquid from the reactor (7) to the gas-absorbent mix before the gas-absorbent mix enters the reactor (7); and
  providing a thermal energy storage unit (2) for storing the gas-absorbent mix to provide thermal energy to supplement or replace heat from the heat source.

13. The method as claimed in claim 7, further comprising the step of:
  providing a booster system (19) for heating the heated and pressurized gas by said heat source or a secondary heat source, operating at least at the same temperature as the gas-absorbent mix, after or at a downstream section of the reactor (7) and before entering the expansion machine (15).

14. The method as claimed in claim 7, further comprising the step of:
  adding at least one chemical in order to reduce the freezing point of the gas-absorbent mix, for adjustment of viscosity or crystallization or for enabling transport of a slurry containing the gas-absorbent mix, said chemical being selected from the group of water, alcohol, oil, silicone oil and defoamer.

15. The method as claimed in claim 7, wherein the gas-absorbent mix includes an absorbent selected from the group consisting of at least one nitrogen-containing chemical compound.

16. The method as claimed in claim 15, wherein the absorbent is selected from the group consisting of DEA (diethanolamine), MEA (monoethanol-amine), morpholine, piperazine, MDEA (methyldiethanolamine), DGA (diglycolamine), DIPA (diisopropanolamine), TEA (triethanolamine) alone or mixed with water or alcohols, lipophilic amines including dialkylamines where alkyl may be methyl, ethyl, and preferably propyl, butyl, sec-butyl and iso-butyl, pentyl, hexyl or alkyl groups with more than six C atom, mixtures thereof including biphasic and thermomorphic amine mixtures, amines coupled to zeolites or silicas, including mixtures with water and/or alcohols such as butanol, hexanol and glycols, aminosilicones, guanidine, amidine, aminoacid derivatives, ionic liquids, alone or in combination with freezing point depressants or chemicals which allow a cold slurry to be transported by mechanical means, including silicone oils, and where the amines have lower absorption enthalpies for the $CO_2$-amine reaction than MEA (monoethanolamine) and have boiling points at 1 bar above 120° C.

17. The method as claimed in claim 15, wherein said nitrogen-containing compound comprises $NH_3$ or amine.

18. The method as claimed in claim 7, comprising at least one of the following:
  the cold temperature of the $CO_2$ exiting the turbine is used for condensing water or making ice to produce fresh water or supply cooling for freezer applications; and
  the excess heat generated in the system provides residential hot water or is used for pre-heating the thermal fluid collecting solar heat at least during part of the operation of the system to achieve a faster start-up.

19. The method as claimed in claim 7, wherein the gas-absorbent mix is subjected to a separation step selected from phase separation, decanting and centrifuging, and wherein the gas-absorbent mix is split into at least two fractions of which the fraction which is richest in $CO_2$ is transferred to the reactor for splitting into $CO_2$ gas and lean absorbent.

20. The method as claimed in claim 7, wherein the gas-absorbent mix is cooled.

21. The method as claimed in claim 7, wherein at least a fraction of the gas-absorbent mix is transferred back to the absorber system (3), in order to achieve a higher loading level.

22. A system according to claim 7 for production of electrical energy.

23. The method as claimed in claim 7, wherein the temperature interval is between −70° C. and plus 140° C.

24. The method as claimed in claim 7, wherein the obtained $CO_2$ pressure in said reactor is between 15 bar and 0.8 bar.

25. The method as claimed in claim 7, wherein the obtained $CO_2$ pressure in said reactor is between 10 bar and 1.2 bar.

26. The method as claimed in claim 7, wherein the $CO_2$ pressure obtained in said absorption system is between 0.3 bar and 0.002 bar.

27. The method as claimed in claim 7, wherein the $CO_2$ pressure obtained in said absorption system is between 0.15 bar and 0.005 bar.

28. The method as claimed in claim 7, wherein the $CO_2$ pressure obtained in said absorption system is between 0.1 bar and 0.01 bar.

29. The method as claimed in claim 7, wherein said material capable of binding CO2 is capable of binding by physical van-der-Waals forces or chemical bonds.

30. The method as claimed in claim 7, wherein the at least one heat source (1) provides thermal energy at up to 120° C.

31. The method as claimed in claim 7, wherein the transferring step comprises transferring thermal energy from the at least one external heat source directly to the reactor (7).

32. The method as claimed in claim 7, wherein the expansion machine providing step comprises: —providing said expansion machine (15) with said generator (23) for producing electricity by expanding only the heated and pressurized CO2 gas from the said reactor (7) into a low temperature CO2 gas by using the low pressure generated in the said absorber system (3).

* * * * *